United States Patent [19]

Gerry

[11] Patent Number: 4,463,708
[45] Date of Patent: Aug. 7, 1984

[54] FUEL AND WATER HOMOGENIZER

[76] Inventor: Martin E. Gerry, 13452 Winthrope St., Santa Ana, Calif. 92705

[21] Appl. No.: 308,909

[22] Filed: Oct. 5, 1981

Related U.S. Application Data

[63] Continuation-in-part of Ser. No. 153,612, May 27, 1980, Pat. No. 4,324,209.

[51] Int. Cl.³ .............................................. F02M 25/02
[52] U.S. Cl. ................................. 123/25 E; 123/25 B;
261/18 A; 366/127; 366/139; 366/146;
366/341; 422/116; 422/199
[58] Field of Search ................. 123/25 B, 25 C, 25 D,
123/25 E, 25 P; 431/208; 44/2; 48/102 R,
189.2; 261/18 A; 252/359 D; 422/116, 129,
199, 202, 208; 366/127, 139, 144, 146, 149, 341

[56] References Cited

U.S. PATENT DOCUMENTS

| | | | |
|---|---|---|---|
| 1,854,298 | 4/1932 | Godward | 48/189.2 |
| 2,686,502 | 8/1954 | Tesch | 261/18 A X |
| 4,013,396 | 3/1977 | Tenney | 431/208 X |
| 4,030,453 | 6/1977 | Sugimoto | 123/25 P X |
| 4,050,419 | 9/1977 | Harpman et al. | 261/18 A X |
| 4,118,797 | 10/1978 | Tarpley, Jr. | 366/127 |
| 4,209,490 | 6/1980 | Duncan et al. | 422/199 X |

FOREIGN PATENT DOCUMENTS 5797  9/1932  Australia ........................ 123/25 B Primary Examiner—Philip R. Coe

[57] ABSTRACT

A system for providing homogenized fluids of fuel and water utilizes a chamber (70) in which the fuel and water is loaded in predetermined quantities. The chamber contains heater (75) which is electrically activated to convert the liquid fuel and water to their vapor states. The chamber also contains a transducer (74) which vibrates the liquified composition of the fuel and water vapors at high frequency rates so as to additionally homogenize it prior to being transferred to storage vessel (96). A vaporizer (99') may be connected to the storage vessel so as to be fed by the homogenized liquid when this system is used in conjunction with an internal combustion engine. The system may provide mechanism (77, 79) for evacuating chamber (70) prior to loading the fuel and water into such chamber. The system also provides pressurizing components (82, 84) that can inject air or oxygen of lower temperatures than that of the vaporized fuel and water molecules so as to convert the vapor phase of these molecules to a homogenized liquid in rapid order. This system can employ a programmer (25 through 40) that activates various controls governing the homogenizing process at predetermined intervals.

19 Claims, 3 Drawing Figures

FUEL AND WATER HOMOGENIZER

CROSS REFERENCE TO RELATED APPLICATION

This application is a continuation-in-part of application Ser. No. 153,612 filed May 27, 1980, now U.S. Pat. No. 4,324,209, and incorporated by reference herein.

DESCRIPTION

1. Technical Field

This invention is in the field of fuels for an engine that develops motive power wherein such engine utilizes water homogenized with the fuels. This invention utilizes vaporization of the fuel and water components in creating the homogenized fluid.

2. Background Art

The prior art, U.S. Pat. No. 4,227,817, provides a method and means utilizing only ultrasonic energy to homogenize the fuel and water components. No provision is made by this prior art to utilize vapor pressure conditions of the fuel and water components to create the homogenized fluid, which homogenized fluid has a chemical structure different from either the fuel or the water components taken separately.

DISCLOSURE OF INVENTION

Therefore, it is an objective of this invention to disclose a practical method of feeding fuel and water components to a vessel in desired proportions and homogenizing these components in such vessel so that there will be a synergistic effect between these components and their subcomponents to create a homogenized fluid of the fuel and water.

The system providing this objective has a chamber which may be evacuated and into which the fuel and water components are injected in predetermined quantities. Such fuel and water components are evaporated in the chamber and the vapor molecules at high vapor pressures of the fuel and water components intermix and bind in a homogenized fluid of such components. The chamber is then pressurized, with optionally injecting cold air or oxygen to quickly return the vapor to the liquid state, resulting in a homogenized liquid of water and fuel. The homogenized liquid is then transferred into a reservoir for retention therein. The retained homogenized liquid may be further transferred by pumping into an automotive vaporizer, usually termed a carburetor or a fuel injector, if such system is installed in an automobile as an integral part of its fuel system.

Additionally, the system providing this objective may also optionally have an AC power source and ultrasonic homogenizing means connected to the power source. The ultrasonic homegenizing means includes a transducer of piezoelectric material selected from the group consisting substantially of barium titanate, lead zirconate titanate, lead metaniobate or mixtures thereof. The transducer has electrically conductive coatings, one on each major face thereof, and the AC power source is connected to such coatings. The AC source has a transformer output which is coupled either directly or through a capacitor to the transducer. Such source provides high voltage and current output to feed the transducer. A method utilizing existing timing means for the engine's ignition system is employed to pulse the AC source on and off so as to create a duty cycle of operation of the AC source and thereby increase the reliability of such AC source.

BEST MODE FOR CARRYING OUT THE INVENTION

Figure 1:
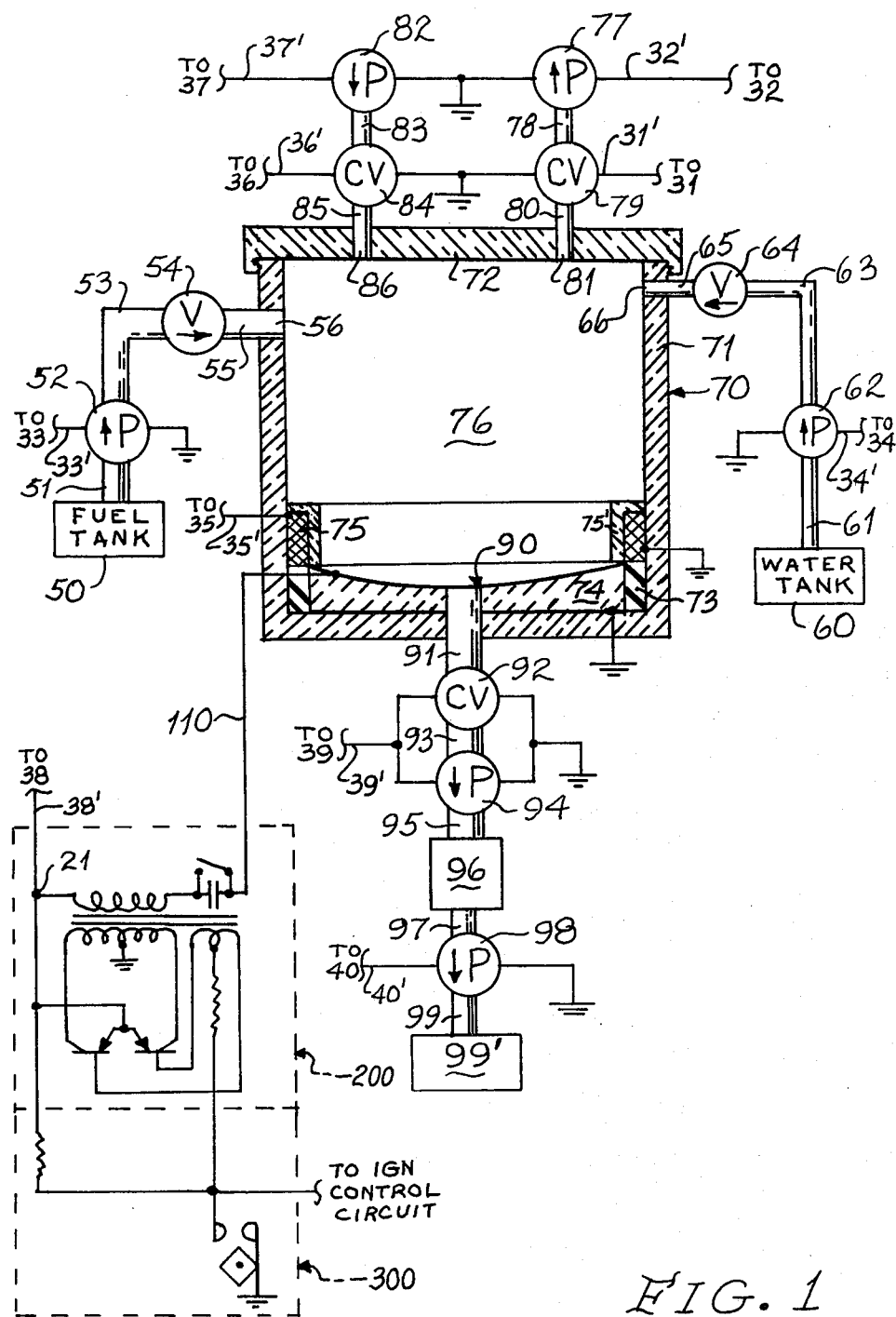
FIG. 1 is an electromechanical schematic showing the combined electrical and non-electrical features of the homogenizing system in accordance with the invention.
Figures 2, 3:
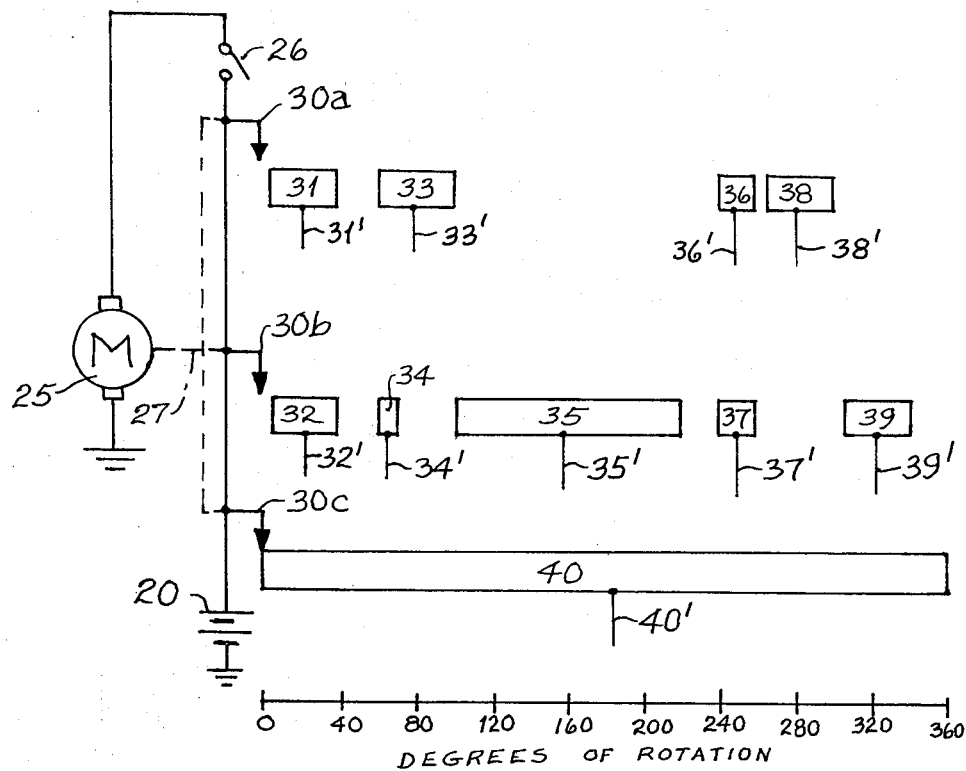
FIG. 2 is an electromechanical schematic of a programmer controlling and timing the events of the homogenizing process in a predetermined sequence.
FIG. 3 is a table showing the beginning and ending periods of each of the events of the programmed process in terms of angular degree rotation of the drive shaft controlling the programmer.

Referring to FIGS. 1 and 2, a system providing a homogenized fluid of fuel and water prior to storing the homogenized fluid in a vessel or prior to feeding such fluid to a fuel burning engine, is disclosed.

The system is displayed in electromechanical format, and it is to be understood that wherever electrical power is connected to the various system elements, only one wire or cable connection will be stated, the other connection of the several system elements being at a common ground potential and representing the return electrical paths, are illustrated by using conventional ground symbology, and consequently such return paths need not be referred to per se in the following description.

Cylindrical enclosure 70 includes body 71 shown as being made of transparent material such as high pressure resistant glass, but could be made of any electrically non-conductive material which will not react with hydrocarbon or inorganic fuels, such as a variety of thermoset plastics, may be used. Body 71 has an annular member 73 of electrically insulating material inserted circumferential the inner surface of body 71, member 73 retaining transducer member 74 therein. The transducer member 74 may be molded to insulating ring 73, and insulating ring 73 may be molded to the inner surface of body 71 in a manner so as not to prevent piezoelectric transducer 74 from vibrating when a voltage of high frequency or high repetition rate is impressed across its conductively coated faces. One of such faces to which cable 110 is connected is concave shaped and the other face at ground potential is opposite to the concave face. The material of the piezoelectric member 74 may be for example either barium titanate, lead zirconate titanate, lead metaniobate or mixtures thereof. The edges of transducer 74 are not electrically coated but are generally bonded to ring 73 so that in effect the two conductive coatings on the transducer faces will form an electrical capacitor with the transducing material of member 74 therebetween. The concave face and the face opposite such concave face each has an electrically conductive coating such as copper, silver, gold or aluminum.

Although the shape of member 74 is shown as being of dish-form, member 74 may be of any shape such as being flat to lend itself to being attached or held to ring 73 by mechanical means or by suitable epoxy resin attaching the grounded face to the inner surface of body 71. It should also be noted that transducer 74 will have a central aperture as at 90 so as to enable the homogenized liquid to be transferred from enclosure 70 to vessel 96, and to be discussed in greater detail hereinbelow.

Body 71 also retains a generally annular electrical heating element 75, such element being bonded to insulating member 73 and electrically connected by means of cable 35' to commutator element 35 of the programmer. Heating element 75 is covered by annular member 75', made of a transparent electrical insulating material such as glass to avoid liquid contact with heating element 75 when the water and fuel components are injected into chamber 70.

A tank 50 containing liquid fuel, which may be any hydrocarbon such as gasoline, diesel fuel, benzene, kerosene, alcohol, any other organic fuel, any inorganic fuel, any synthetic fuel whether organic or inorganic or mixtures thereof, is connected by means of line 51 to pump 52. Pump 52 raises the liquid fuel in line 51 and passes such fuel through line 53 and through valve 54. Such raising action is accomplished by virtue of connection of pump 52 by means of cable 33' to commutator 33 of the programmer. Valve 54 is unidirectional acting, which by pressure of the fuel in line 53 permits the flow of the liquid fuel in direction shown by the arrow on pump 52 and valve 54 and not in reverse direction to these arrows. Hence when pump 52 is energized, the liquid fuel will flow through valve 54 and through line 55, and exit through opening 56 in line 55 to load chamber 70 with the predetermined fuel quantity desired. The quantity of liquid fuel pumped from tank 50 is controlled either by the inner diameter dimension of lines 51, 53 and 55, the rate of pumping produced by pump 52, and/or the duration in terms of degrees of rotation of programmer shaft 27 that drives contactor 30a across commutator 33. Operation of the programmer shown in FIG. 2, will be separately discussed hereinbelow.

Water, homogenized with liquid fuels creates a synergystic effect when the homogenized composition of fuel and water is ignited, increasing the energy in the case of the ignited composition dramatically as compared with the use of the fuel alone in the absence of the water component. Such fuels are generally of organic character by virtue of their carbon content. However, it is conceivable that synthetic fuels may also be developed that will homogenize with water and which may be of either the organic or inorganic group. For the present, the most promising fuels are compounds of the group consisting substantially of gasoline, diesel fuel, alcohol, benzene, kerosene, ether, hydrazine or mixtures thereof.

Summarily, gasoline may be exemplified by the formulation of heptane $(C_7H_{16})+2,2,4$-trimethylpentane $(C_8H_{18})$, $C_8H_{18}$ also being known by the name of Isooctane. Gasoline may also be exemplified by the formulation of heptane $(C_7H_{16})+2,2,3$-trimethylbutane (Triptan). Other additives to the fuels, besides those such as Isooctane or Triptan may be typified by Ethyl Fluid. Ethyl fluid formulation includes tetraethyl lead $[Pb(C_2H_5)_4]+$ethylene dibromide $[C_2H_4Br_2]+$ethylene dichloride $[C_2H_4Cl_2]$. Tetraethyl lead is an anti-knock or anti-detonation component generally found in gasolines.

Vapor pressures of the liquid fuels, built up with rises in temperature within chamber 70 will play an important role in the homogenizing process, and the following fuel components and water illustrate the vapor pressures obtainable when chamber 70 is heated.

TABLE 1

| Component | Temperatures in Degrees Centigrade to Produce Vapor Pressures in Atmospheres of | | | | |
|---|---|---|---|---|---|
| | 1 | 2 | 5 | 10 | 20 |
| water | 100.0 | 120.5 | 152.5 | 180.5 | 213.0 |
| heptane | 98.4 | 124.8 | 165.7 | 202.8 | 247.5 |
| pentane | 36.1 | 58.0 | 92.4 | 124.7 | 164.3 |
| cyclohexane | 80.7 | 106.0 | 146.4 | 184.0 | 228.4 |
| methanol | 64.7 | 84.0 | 112.5 | 138.0 | 167.8 |
| ethanol | 78.4 | 97.5 | 126.0 | 151.8 | 183.0 |
| benzene | 80.1 | 103.8 | 142.5 | 178.8 | 221.5 |

Tank 60, containing water in its liquid state, generally at room temperature, is connected by means of line 61 to pump 62. Pump 62 raises the liquid water in line 61 and passes such water through line 63 and through valve 64. Such raising action is accomplished by virtue of connection of pump 62 by means of cable 34' to commutator segment 34 of the programmer. Valve 64 is unidirectional acting, which by pressure of the water in line 63 permits the flow of the water component in direction shown by the arrow on pump 62 and on valve 64, and not in reverse direction to these arrows. Hence, when pump 62 is energized, the water component will flow through valve 64 and through line 65, and exit through opening 66 in line 65 to load chamber 70 with the predetermined water quantity. The quantity of water pumped from tank 60 is controlled either by the inner diameter dimension of lines 61, 63 and 65, the rate of pumping produced by pump 62, and/or the duration in terms of degrees of rotation of programmer shaft 27 that drives contactor 30b across commutator segment 34. In the illustrated example, it was assumed that a lesser volume of water would be desired in comparison with the volume of the liquid fuel, and therefore lines 61, 63 and 65 have a smaller inner diameter than lines 51, 53 and 55.

The reverse line dimensions are also possible whenever the water quantity desired in chamber 70 is greater than the fuel quantity, as for example when the homogenizing process is used to create a fluid for injection into an engine in lieu of ordinary water where such water injectors are used.

Cover 72 of chamber 70 is generally made of the same material as body 71. Threads are provided at the inner periphery of cover 72 and the outer periphery of body 71 to enable cover 72 to be securely screwed on to body 71. Securing cover 72 is necessary in view of the high vapor pressures that will be developed during the homogenizing process as typified in table 1.

Cover 72 is provided with both a subsystem for evacuating chamber 70 by pressure reduction therein preceding the loading of chamber 70 with the fuel and water components, and also a subsystem for pressurizing chamber 70 at the end of the homogenizing process.

Accordingly, vacuum pump 77 is connected by means of line 78 to control valve 79, denoted by the letters CV, and control valve 79 is connected to line 80 which passes through a vacuum tight aperture in cover 72 to evacuuate chamber 70 by pulling out the air at 76 within chamber 70 prior to loading chamber 70 with fuel and water. Control valve 79 is a positive action electrically operated valve which may be of the rapid solenoid control type to prevent air from being admitted when valve 79 is closed and to be opened so that vacuum pump 77, denoted by the letter P, can pull out the air from chamber 70 in direction shown by the arrow on pump 77 when such pump is activated. Valve 79 is electrically connected by means of cable 31' to commutator segment 31 of the programmer. When valve 79 is opened, pump 77 begins to evacuate chamber 70 in accordance with the period established by programmer action, to be referred to hereinbelow.

Evacuation of chamber 70, which is an optional step in the homogenizing process, reduces the temperatures shown in table 1 at which the vapor pressures are created. Hence, heater element 75 will not have to be energized for as long a time period as when chamber 70 is not evacuated.

After evacuation, if used, the fuel and water components are injected to a predetermined level in chamber 70, generally to the height of heater element casing 75'. The specific gravity of the water component generally being greater than the fuel component, a layer of water will form at the bottom of chamber 70 with a layer of the fuel component over and on top of the water layer. Adequate volume remains in chamber 70 above the level of fuel layer, such adequate volume being represented by numeral 76, in which volume the vapors of the fuel and water components will rise with accompanied turbulence of the fuel molecules and the water molecules to become a single vapor of fuel-water molecular composition. Such fuel-water molecular composition will continuously increase in its density, being confined to a constant volume of chamber 70, as the entire fuel-water liquid is converted to the gaseous state and occupy the entire inner volume of chamber 70.

An additional and optional step in the homogenizing process is to utilize ultrasonic vibrations to further create turbulence of the fuel-water molecular composition. Such vibrations are created by energizing piezoelectric transducer 74 connected by means of cable 110 to a high frequency electrical generator 200 triggered by switching means 300. Generator 200 and switching means 300 as well as the effect of the vibration of transducer 74 are detailed in U.S. patent application Ser. No. 153,611 filed May 27, 1980 which had been incorporated by reference herein. Generator 200 is electrically powered by virtue of cable 38' being connected to commutator segment 38 of the programmer.

At the end of the homogenizing process, chamber 70 is pressurized by injecting therein oxygen or air that will quickly convert the fuel-water molecular vapor composition at 76 in chamber 70 to the liquid state. The liquid state of the fuel and water composition will now be completely homogenized.

Homogenization is herein defined as the process during which molecules of liquid fuel and water are interspersed with each other and would normally remain so interspersed indefinitely.

Hence, to terminate the process, pressurizing pump 82 is provided so as to inject air or oxygen into chamber 70 in direction indicated by the arrow on the pump. To enable such air or oxygen injection to take place, control valve 84, of the same type as control valve 79, is opened so that the air or oxygen will be fed at high pressure by means of pumping action of pump 82 through line 83, through control valve 84, through line 85 and through opening 86 in line 85 into chamber 70. Control valve 84 is connected by means of cable 36' to commutator segment 36 of the programmer, and pump 82 is connected by means of cable 37' to commutator segment 37 of such programmer. Such pump and control valve are operated by means of the programmer for a predetermined period in terms of degrees of rotation of shaft 27 of such programmer, detailed hereinbelow.

It should be noted that a microwave antenna, not shown, may be used in lieu of heater 75, connected to a microwave generator, not shown, by means of cable 35'. In such case, the antenna will radiate microwave energy to heat the fuel and water components.

Line 91 extends through a liquid-tight opening in body 71 and through another liquid-tight opening in transducer 74 into chamber 70 at 90, providing means of removing the homogenized liquid from chamber 70 into a retaining vessel. Accordingly, after the conversion from the vapor to the liquid state, the homogenized composition of fuel and water is passed through line 91 when control valve 92 is opened. Control valve 92 is of the same type as control valve 79, and is needed to prevent fluid leakage from chamber 70. If the retaining vessel 96 is located at a level above the level of chamber 70 an additional pump 94 would be needed to remove the homogenized liquid at the bottom of chamber 70. If the retaining vessel 96 is at a lower elevation than chamber 70, pump 94 will not be needed. Assuming that retaining vessel 96 is above the level of chamber 70, line 93 is utilized to connect control valve 92 to pump 94. Line 95 is used to connect pump 94 to retaining vessel 96. Both control valve 92 and pump 94 are electrically in parallel, being connected by means of cable 39' to commutator segment 39 of the programmer. Consequently, when the programmer will activate control valve 92 and pump 94, such activation enables the homogenized liquid of fuel and water to be transferred from chamber 70 to retaining vessel 96, in accordance with the specific periods allocated by the programmer to execute this function, and detailed hereinbelow. Normally, this step would constitute the end of the homogenizing process for homogenized fluids to be removed from vessel 96 and packaged or transferred for sale elsewhere.

However, if this system is to be adapted to an engine, such as an automotive or tractor engine, the an additional step of passing the homogenized fluid to the engine vaporizer would be necessary. Such step is accomplished by virtue of vessel 96 being connected by means of line 97 to pump 98, which pump 98 is connected by means of line 99 to the engine's vaporizer, generally referred to as a carburetor or fuel injector. The inactivity of pump 98 prevents the transfer of the homogenized fluid from vessel 96 to vaporizer 99'. But since pump 98 would be electrically connected by means of cable 40' to commutator 40 of the programmer, when an engine is fed by the homogenized fluid, pump 98 is continuously activated, such pump being powered by DC source 20 when switch 26 is closed, which switch 26 could be an element of the engine's ignition switch mechanism, and power to pump 98 is provided through driven contactor 30c in continuous contact with commutator 40 of the programmer.

The result of feeding the homogenized fluid to an engine instead of fuel only, would provide additional synergism wherein the molecular structure of water will probably break down under high energy ionization of the fluid by action of the high energy ignition electrical arc of the ignition system normally used, so that the hydrogen component of the fuel-water molecule will actively combine with the hydrocarbons of the fuel, and the oxygen component of the fuel-water molecule will support the combustion process of such fuel-water molecules within the engine's combustion chamber to obtain more energy from each unit quantity of homogenized fluid as compared with a similar unit quantity of fuel alone.

Referring to FIGS. 2 and 3, the programmer chosen was a simple analog timer sequencer to facilitate understanding of the described process, since the programmer's functions were to provide power to components controlling the process in a predetermined order. It is of course possible to use a small computer in lieu of this programmer. One revolution of drive shaft 27 of the programmer provides activation of all the electrically controlled valves, pumps, heater element and the high frequency electrical generator. Such one revolution could constitute any reasonable period of time necessary to accomplish the functions indicated in table 2, below. A reasonable period of one revolution of shaft 27 could be 60 seconds, so that a typical fractional horsepower geared down motor of one shaft revolution per minute could be used as motor 25 having shaft 27.

Consequently, when switch 26 is closed, power from battery 20 is available to drive motor 25, shaft 27 being mechanically coupled to movable contactors 30a, 30b and 30c to drive such contactors across and in cooperation with the various commutator segments at the indicated angular positions for each commutator segment as shown in the table constituting FIG. 3 to effect the functions of providing the various electrical components shown in FIG. 1 with DC power, as referenced above. It is of course understood that the programmer of FIG. 2 has its segments laid out in a group of three circular structures, but is shown in a linear graphical illustration in FIG. 2 for ease of understanding.

Operation of such control valves, pumps, heater element and power generator are referenced in FIG. 3 by the respective commutator segments of the programmer that also refer to the functions performed by each of such of the commutator segments, and the beginning and ending of each function is indicated in degree positions of the programmer shaft 27. For example, function 31 is identified by commutator segment 31 in FIG. 2 and it is to be noted that when contactor 30a is in cooperation with segment 31 beginning at 2 degrees of shaft 27 rotation and ending at 40 degrees of such rotation, control valve 79 will remain open for that period. If the total time for shaft 27 rotation of its complete 360 degree rotation in 60 seconds, then the period of time during which valve 79 is open is (40°−2°)/360°×60 seconds=6.33 seconds. It is therefore obvious that the programmer operation can be explained completely in terms of the tabular information stated in FIG. 3. Such programmer operation may be stated in tabular format by referring to FIGS. 1, 2 and 3, as follows:

TABLE 2

| Commutator Segment Being Powered | Component Being Activated | Function Being Performed |
|---|---|---|
| 31, 32 (optional) | control valve 79 and pump 77 | evacuate chamber 70 |
| 33 | pump 52 | inject liquid fuel in chamber 70 |
| 34 | pump 62 | inject water in chamber 70 |
| 35 | heater 75 | vaporize the fuel and water in chamber 70 |
| 38 (optional) | transducer 74 | vibrate vapor molecules in chamber 70 |
| 36, 37 | control valve 84 and pump 82 | pressurize chamber 70 and convert vapor to liquid |
| 39 | control valve 92 | transfer homogenized |

TABLE 2-continued

| Commutator Segment Being Powered | Component Being Activated | Function Being Performed |
|---|---|---|
|  | and pump 94 | fluid to retainer vessel 96 |
| 40 (optional) | pump 98 | pump homogenized liquid from vessel 96 to vaporizer 99' |

I claim:

1. A system for homogenizing liquid fuel and water components, comprising the combination of:
    a chamber into which said fuel and water components are loaded in their liquid states and in predetermined quantities:
    heating means, integral with said chamber, for converting said components from the liquid to the gas state, and for interspersing vaporized molecules of said components;
    pressurizing means, connected to the chamber, for converting the vaporized molecules to a homogenized liquid;
    a storage vessel coupled to said chamber; and
    transferring means, connected between said chamber and storage vessel, for removing the homogenized liquid from the chamber and into said storage vessel.

2. The system as stated in claim 1, including evacuating means connected to the chamber, for removing air from the chamber and for reducing the chamber's internal pressure.

3. The system as stated in claim 1, including:
    a transducer integral with and within said chamber; and
    electrical generating means, connected to said transducer, for vibrating said transducer and thereby additionally homogenizing the already homogenized liquid.

4. A system for homogenizing liquid fuel and water components, comprising the combination of:
    a chamber into which said fuel and water components are loaded in their liquid states and in predetermined quantities;
    heating means, integral with said chamber, for converting said components from the liquid to the gas state, and for interspersing vaporized molecules of said components;
    pressurizing means, connected to the chamber, for converting the vaporized molecules to a homogenized liquid;
    a storage vessel coupled to said chamber;
    first transferring means, connected between said chamber and storage vessel, for removing the homogenized liquid from the chamber and into said storage vessel;
    a vaporizer coupled to said storage vessel; and
    second transferring means, connected between said storage vessel and vaporizer, for feeding said homogenized liquid from said storage vessel to said vaporizer.

5. The system as stated in claim 1, including:
    electrically operated controls coupled to said chamber; and
    a programmer, connected to said electrically operated controls, for activating said electrically operated controls at predetermined intervals.

6. The system as stated in claim 1, wherein said liquid fuel component constitutes at least one compound selected from the group consisting substantially of gasoline, diesel fuel, benzene, kerosene, alcohol, ether and hydrazine.

7. The system as stated in claim 1, wherein said heating means creates vapor pressures of said components within said chamber that are in excess of atmospheric pressures at sea-level.

8. A system for homogenizing liquid fuel and water components, comprising the combination of:
a chamber into which said fuel and water components are loaded;
first means, coupled to said chamber, for reducing the chamber's internal pressure;
second means, adapted to said chamber, for vaporizing and intermingling said components in said chamber; and
third means, coupled to said chamber, for pressurizing said chamber so as to convert the intermingled vapor components into a liquid.

9. The system as stated in claim 8, wherein said components are vaporized to vapor pressures in excess of atmospheric pressure at sea level.

10. The system as stated in claim 8, wherein said third means constitutes means for cooling said intermingled vapor components.

11. The system as stated in claim 8, including fourth means, coupled to said chamber, for transferring said liquid out of said chamber.

12. The system as stated in claim 11, including a storage vessel coupled to said fourth means, said storage vessel being means for retaining the transferred liquid.

13. The system as stated in claim 12, including a vaporizer of a fuel burning engine, wherein said storage vessel is coupled to said vaporizer.

14. The system as stated in claim 11, including a vaporizer of a fuel burning engine, wherein said fourth means constitutes means for transferring the liquid to said vaporizer.

15. The system as stated in claim 4, including evacuating means connected to the chamber, for removing air from the chamber and for reducing the chamber's internal pressure.

16. The system as stated in claim 4, including:
a transducer integral with and within said chamber; and
electrical generating means, connected to said transducer, for vibrating said transducer and thereby additionally homogenizing the already homogenized liquid.

17. The system as stated in claim 4, including:
electrically operated controls coupled to said chamber; and
a programmer, connected to said electrically operated controls, for activating said electrically operated controls at predetermined intervals.

18. The system as stated in claim 4, wherein said liquid fuel component constitutes at least one compound selected from the group consisting substantially of gasoline, diesel fuel, benzene, kerosene, alcohol, ether and hydrazine.

19. The system as stated in claim 4, wherein said heating means creates vapor pressures of said components within said chamber that are in excess of atmospheric pressures at sea-level.

* * * * *